United States Patent
Ante et al.

(10) Patent No.: US 7,007,976 B2
(45) Date of Patent: Mar. 7, 2006

(54) SEATBELT LOCK CASING WITH AN INTEGRATED FORCE-SENSING DEVICE

(75) Inventors: Johannes Ante, Regensburg (DE); Dorin Diaconu, Timisoara (RO); Leif Reinhold, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/454,835

(22) Filed: Jun. 5, 2003

(65) Prior Publication Data

US 2004/0044455 A1 Mar. 4, 2004

(30) Foreign Application Priority Data

Jul. 16, 2002 (RO) .............................. A2002-00991

(51) Int. Cl.
*B60R 22/00* (2006.01)
(52) U.S. Cl. .................. 280/801.1; 180/268; 280/806; 24/629
(58) Field of Classification Search ................ 280/735, 280/801.1; 180/268; 73/862.381, 862.393, 73/862.391; 24/303, 325, 629, 639, 640, 24/642
See application file for complete search history.

(56) References Cited

U.S. PATENT DOCUMENTS

| | | | |
|---|---|---|---|
| 4,027,905 A | 6/1977 | Shimogawa et al. | |
| 4,257,626 A | 3/1981 | Adomeit | |
| 4,902,039 A | 2/1990 | Kawai et al. | |
| 5,060,977 A * | 10/1991 | Saito | 280/802 |
| 5,332,261 A | 7/1994 | Siepierski | |
| 5,419,019 A | 5/1995 | Ida | |
| 5,839,174 A * | 11/1998 | Chamings et al. | 24/633 |
| 6,230,088 B1 | 5/2001 | Husby | |
| 6,301,977 B1 | 10/2001 | Stojanovski | |
| 6,400,145 B1 * | 6/2002 | Chamings et al. | 324/207.26 |
| 6,454,304 B1 | 9/2002 | Steffens, Jr. | |
| 6,520,032 B1 | 2/2003 | Resh et al. | |
| 6,578,432 B1 | 6/2003 | Blakesley et al. | |
| 6,679,524 B1 * | 1/2004 | Greib et al. | 280/801.1 |
| 6,729,194 B1 * | 5/2004 | Kaijala et al. | 73/862.69 |
| 6,776,056 B1 * | 8/2004 | Garver et al. | 73/862 |
| 6,843,143 B1 * | 1/2005 | Steele et al. | 73/862.393 |
| 6,851,503 B1 * | 2/2005 | Almaraz et al. | 180/268 |
| 2002/0171234 A1 | 11/2002 | Stephen et al. | |
| 2003/0025258 A1 | 2/2003 | Roick | |
| 2003/0084731 A1 | 5/2003 | Muraishi | |
| 2004/0036269 A1 * | 2/2004 | Ante et al. | 280/801.1 |
| 2004/0044455 A1 | 3/2004 | Ante et al. | |

FOREIGN PATENT DOCUMENTS

DE 100 49 528 A1 4/2001

OTHER PUBLICATIONS

Office Action from German Patent Office dated Jul. 14, 2004, issued in counterpart German Application.

* cited by examiner

*Primary Examiner*—Paul N. Dickson
*Assistant Examiner*—Toan C. To
(74) *Attorney, Agent, or Firm*—Morrison & Foerster, LLP (57) ABSTRACT

Seatbelt lock casing with an integrated force-sensing device for measuring a belt tensile force acting on a seatbelt lock, containing a moving anchor that protrudes through an opening formed in a front wall of the casing and has a stop that restricts the movement of the anchor from the casing against an elastic support operating between the casing and anchor, and a sensor attached to the casing for registering the position of the moving anchor.

12 Claims, 8 Drawing Sheets

SEATBELT LOCK CASING WITH AN INTEGRATED FORCE-SENSING DEVICE

CLAIM FOR PRIORITY

This application claims priority to Romanian Application No. A2002-00991, which was filed on Jul. 16, 2002, which is hereby incorporated by reference.

TECHNICAL FIELD OF THE INVENTION

The invention relates to a seatbelt lock casing with an integrated force-sensing device for measuring a belt tensile force acting on a seatbelt lock.

BACKGROUND OF THE INVENTION

To better protect occupants in an automobile it is necessary to measure the belt force of a person wearing a seatbelt. The data is processed and used, during an accident for instance, to calculate the optimum triggering of belt tensioners and airbags.

A measuring device should measure belt forces in the range 0–150 N with an accuracy of approx. +/–2.5%. Belt forces of up to 10,000 N can occur during standard operation of the automobile's force-sensing device when a person is belted. These forces must be measured properly and must not cause damage to the measuring device. During an accident the belt force can rise to, and exceed, 20,000 N. The seatbelt lock or seatbelt lock casing may, in this case, sustain permanent deformation damage but must not fail to operate properly. The force-sensing device may be damaged in the course of this event.

A tried-and-tested principle for measuring forces is to measure displacement on a resilient component on which a force has impinged (spiral spring, torsion spring, coil spring). An overload can easily be intercepted here if, after traveling beyond a path or angle specified in the design, the resilient component strikes a mechanical stop (step, edge).

U.S. Pat. No. 6,230,088 B1 discloses a seatbelt lock casing which is connected via a force-sensing device to an anchoring point secured to a vehicle's bodywork. Such an arrangement is complicated to install and exhibits poor force flow.

SUMMARY OF THE INVENTION

The invention provides a simply structured and easily installable force-sensing device with an improved force flow.

In one embodiment of the invention, a seatbelt lock casing is provided that incorporates a force-sensing device. Integrating the force-sensing device in the seatbelt lock reduces the required number of parts. Installation space is also saved and a more appealing design facilitated. The price is lower as a consequence of the reduced number of components and installation steps. Furthermore, integrating the force-sensing device in the seatbelt lock results in a saving in securing points between the seatbelt lock and force-sensing device, thus facilitating optimum force flow.

In one aspect of the invention, a seatbelt lock casing is provided wherein the moving anchor is restored to an initial state by means of a torsion spring when a belt force has ceased to act. One advantage of this is that it is easy to determine whether the sensor needs replacing. If the torsion spring and/or casing are deformed owing, for instance, to an excessive force due to an accident, there is a zero shift of the sensor. In this case the sensor needs to be replaced.

In another aspect of the invention, a seatbelt lock casing is provided wherein additional installation space and costs are saved as a result of eliminating the torsion spring as a separately formed component.

In still another embodiment of the invention, it is possible to output a measured force by electrical means.

In yet another embodiment of the invention, detection of locking and force measurement can take place simultaneously. This eliminates the need for two measuring components that have to be constructed separately and have separate cable contacting.

The seatbelt lock casing according to the invention comprising an integrated force-sensing device can be employed for virtually any type of belt and facilitates not only the recognition of a properly worn belt but also controlling for optimum triggering of a belt tensioner and/or airbag.

BRIEF DESCRIPTION OF THE DRAWINGS

Preferred exemplary embodiments of the invention are described below with reference to the attached drawings.

The same reference numbers are used below for the same components in FIGS. 1 to 8.

DETAILED DESCRIPTION OF THE INVENTION

A first exemplary embodiment of the seatbelt lock casing according to the invention is described with reference to FIGS. 1 to 3.

Figure 1:
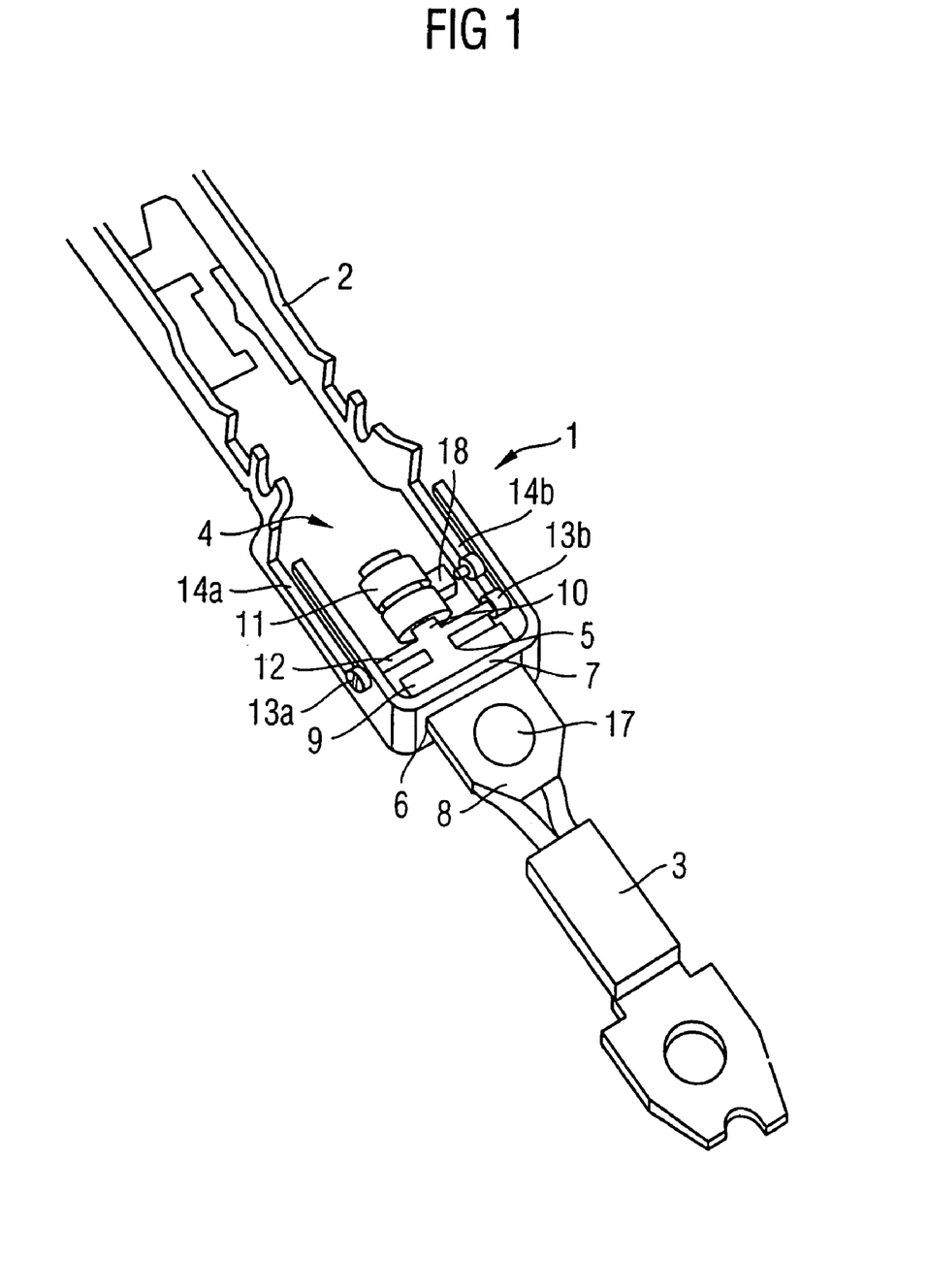
FIG. 1 shows a view of a seatbelt lock casing according to a first exemplary embodiment of the invention in the installed condition, without a case cover.
Figure 2A:
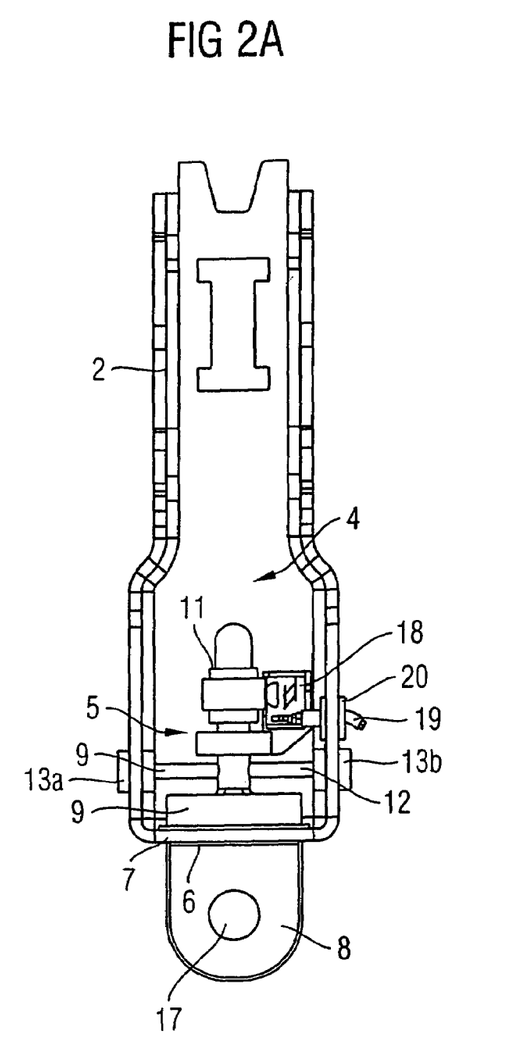
FIG. 2a shows a top view onto the seatbelt lock casing according to FIG. 1.
Figure 2B:
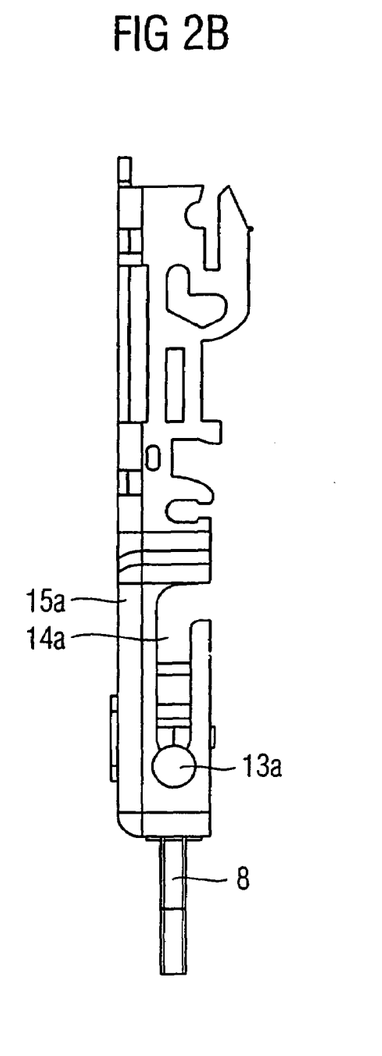
FIG. 2b shows a lateral view of the seatbelt lock casing according to FIG. 1.
Figure 3:
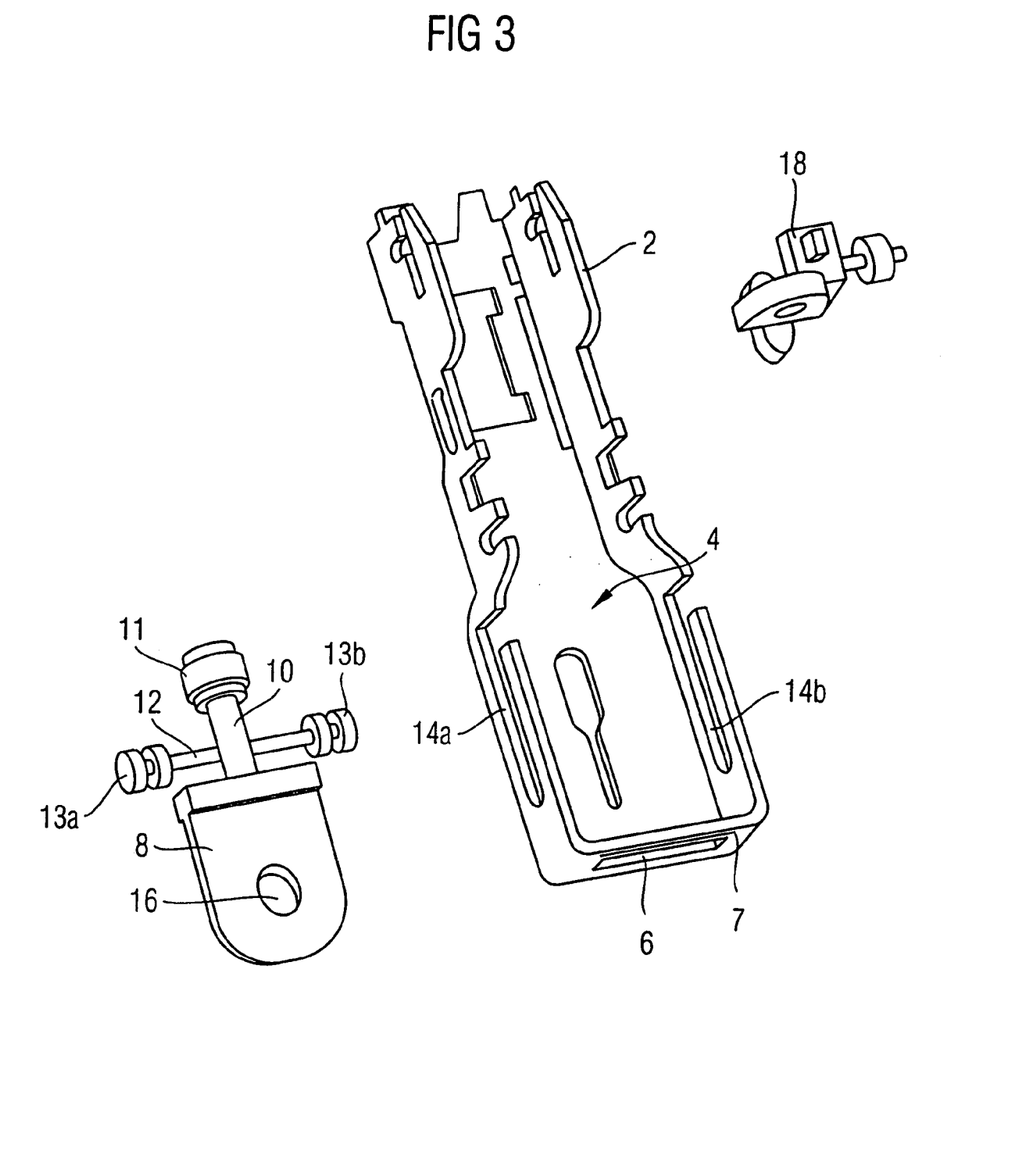
FIG. 3 shows an exploded drawing of the view in FIG. 1.

As shown in FIGS. 1 to 3, a force-sensing device 1 has been integrated in a seatbelt lock casing 2 of a seatbelt lock that is known in its structure per se and connected to a chassis or bodywork via an anchorage 3.

An area 4 of the casing of the seatbelt lock in which force-sensing device 1 is accommodated borders an area of the seatbelt lock casing including a locking mechanism (not shown) that is known per se.

A moving anchor 5 is arranged in casing area 4. The part of anchor 5 facing away from the seatbelt lock casing in the assembled condition is designed as a lug 8 which protrudes through an opening 6 in a wall 7 of seatbelt clock casing area 4 and which is designed with a flange-type stop 9 that forms a step and that restricts the mobility of anchor 5 from casing area 4.

Extending from stop 9 to the inside the casing is a stud 10 on whose end a magnet 11 is located. Arms of a torsion spring 12 extend from stud 10 toward both sides of casing area 4. Stop 9, stud 10, and torsion spring 12 are of integral design, for example. It is also possible for torsion spring 12 to be directed through a clearance hole (not shown) formed in the stud.

Guide rollers 13a and 13b are rotatably attached to the end areas of torsion spring 12. Alternatively, the guide rollers can be replaced by rigid guide components made of a material having a low coefficient of friction or they may be totally absent. Guide rollers 13a and 13b of anchor 5 are directed into guides 14a and 14b which are formed in opposite side walls 15a and 15b of casing area 4 and which terminate in stop or bearing surfaces 14c, 14d. Guides 14a, 14b are preferably designed as slots and are open at the top at their ends facing away from the bearing surfaces 14c, 14d to facilitate entry of guide rollers 13a and 13b of torsion spring 12.

As best shown in FIG. 3, lug 8 has a hole 16 via which seatbelt lock casing 2, which includes force-sensing device 1, is permanently connected to anchorage 3 by means, for example, of a rivet 17.

Movements of anchor 5 cause changes in the field strength allowing them to be registered by a Hall sensor 18 which is located in casing area 4 of the seatbelt lock and which supplies electrical signals. These signals can be conveyed to, for example, a control device (not shown) for driving belt tensioners or an airbag.

The force-sensing device is installed in such a way that when the cover (not shown) of seatbelt lock casing 2 is removed, lug 8 of anchor 5 is directed through opening 6 and guide rollers 13a,b at the ends of the elastically pliable arms of torsion spring 12 are introduced into guides 14a,b. Sensor 18 is then installed and the lead directed through the casing. When the cover is in place, the force-sensing device is protected and securely housed in the seatbelt lock casing.

The dimensions of guide rollers 13a,b and stop 9 are preferably set such that anchor 5 can be moved within a void area that is restricted in one direction by the guide rollers' making contact with the bearing surfaces 14c, 14d of guides 14a, 14b and in the other direction by stop component 20 formed, for example, in at least one of guides 14a,14b, as shown in FIG. 2a, in order to restrict the movement of anchor 5 into the casing.

When a seatbelt is put on and a locking mechanism, whose structure is known per se and which is included in seatbelt lock casing 2, is fastened, a slight belt force takes effect. The effect of this belt force is that the guide rollers of torsion spring 12 will make reliable contact with the bearing surfaces 14c, 14d of guides 14a,14b. If the belt force is further increased, anchor 5 will be withdrawn from opening 6 with increasing deformation of torsion spring 12 until stop 9 of anchor 5 makes contact with the inside of front wall 7 of casing area 4 in order to prevent impermissibly extensive deformation of or damage to torsion spring 12.

It is possible with the force measuring device according to the invention to reliably determine whether a belt has been properly put on (guide rollers stopped against bearing surfaces and no or only slight deformation of the torsion spring). Within the operating range of the force-sensing device (elastic deformation area of the torsion spring) it is possible to accurately measure forces of up to, for instance, around 10,000 N. Forces in excess of this that will occur during a crash are taken up by the stop. The course over time of the build-up of force within the operating range yields information about an imminent crash that can be used to control a belt tensioner or airbag. Damaging of the force-sensing device can therefore be detected from its zero shift (guide rollers making contact with the bearing surfaces without the effect of force).

According to the first exemplary embodiment, no significant tilting forces arise on account of the symmetrical anchor and its dimensions.

Figure 4:
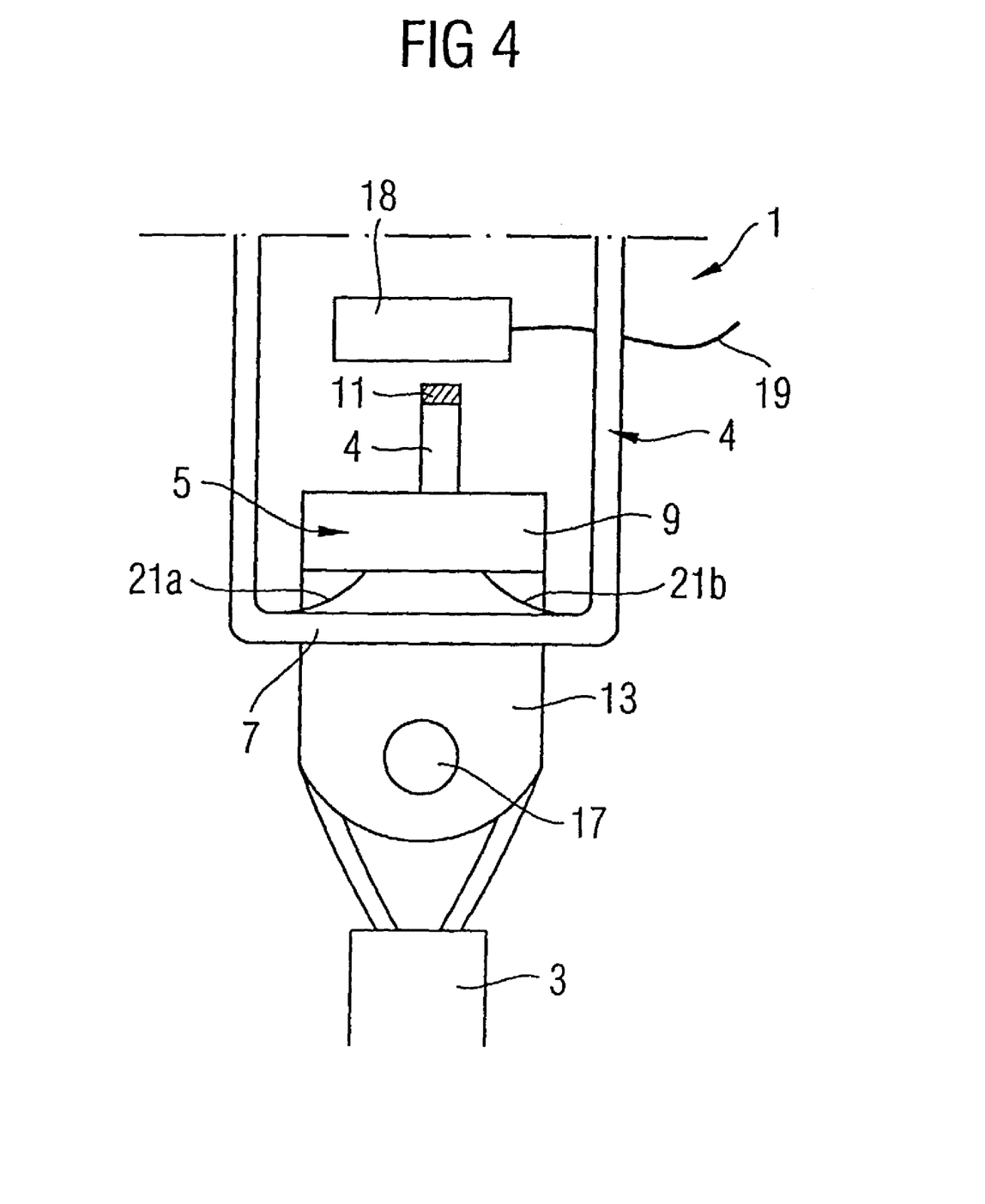
FIG. 4 shows a top view onto a seatbelt lock casing according to a second exemplary embodiment of the invention with cover removed.

FIG. 4 gives a partial view of a seatbelt lock casing secured to an anchorage 3 according to a second exemplary embodiment of the invention.

The second exemplary embodiment differs from the first exemplary embodiment in that torsion spring 12 has been replaced by spring components 21a and 21b which act between front wall 7 of casing area 4 and stop 9. Spring components 21a and 21b are advantageously designed to form an integral part of the wall of the casing by being partially punched from the wall of the casing and appropriately bent. An alternative possibility is to form spring components 21a and 21b at another suitable location on casing area 4, for example in side walls 15a, 15b or in the rear wall of casing area 4, as shown in FIGS. 5, 6a, and 6b.

Figure 5:
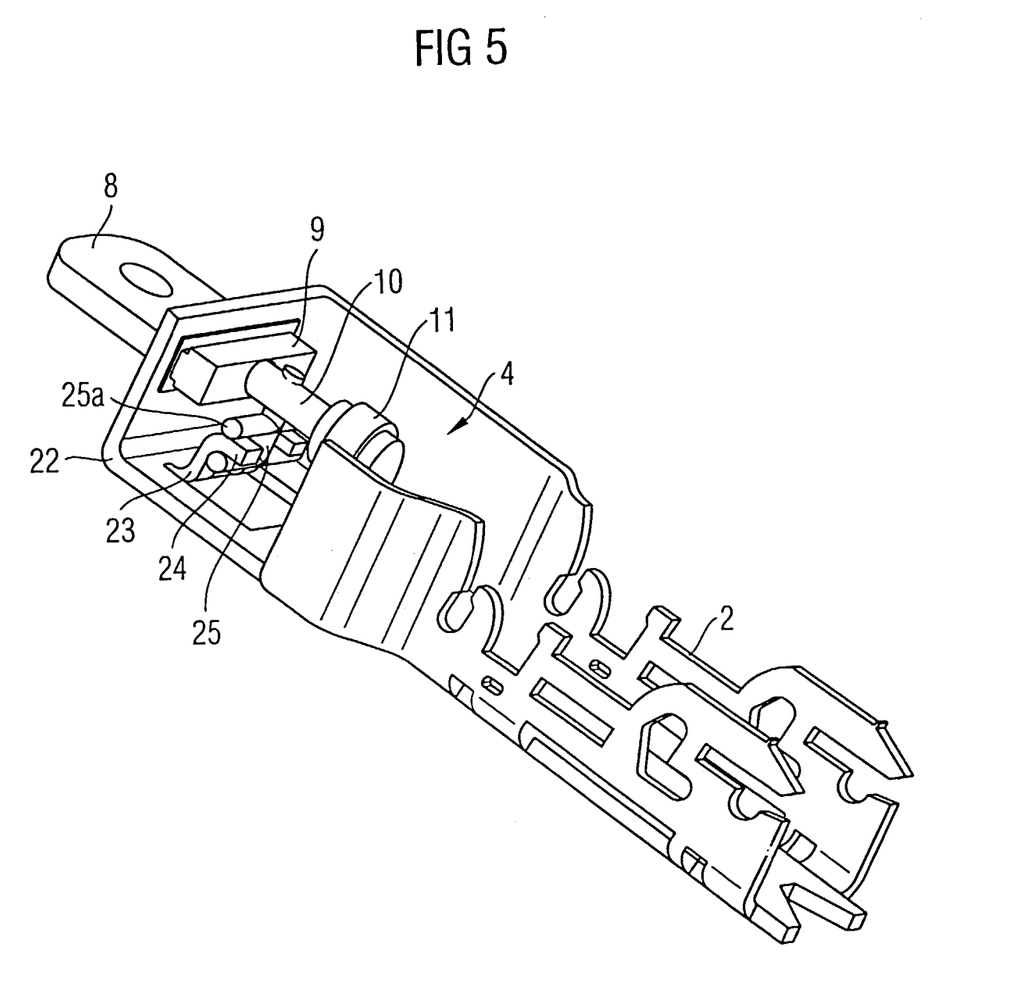
FIG. 5 shows a view of a seatbelt lock casing according to a third exemplary embodiment of the invention, without a case cover.
Figure 6A:
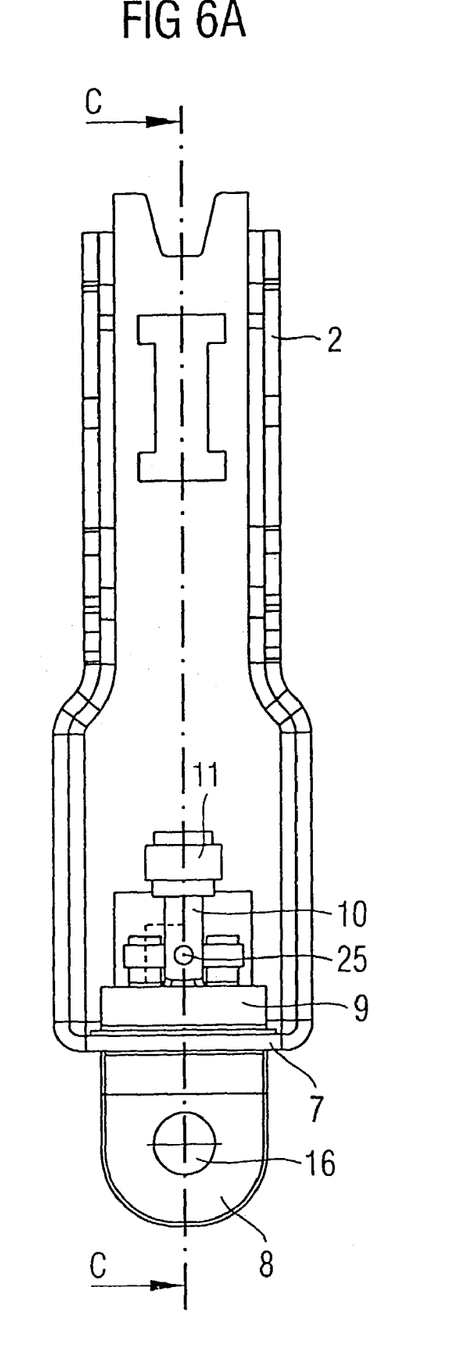
FIG. 6a shows a top view onto the seatbelt lock casing according to the third exemplary embodiment of the invention as per FIG. 4.
Figure 6B:
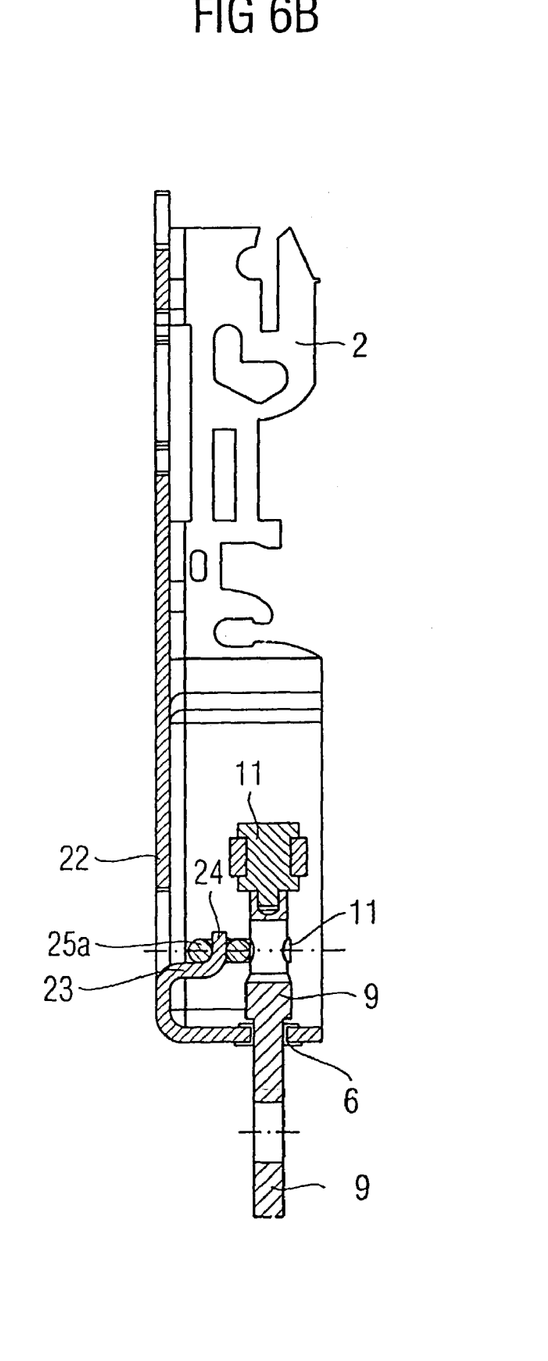
FIG. 6b shows a lateral view of the seatbelt lock casing according to the third exemplary embodiment of the invention as per FIG. 4.

FIGS. 5, 6a, and 6b show a third exemplary embodiment according to the invention wherein, by contrast with the first and second exemplary embodiments, the elastic support is designed to form an integral part of the rear wall of the casing 22 of the seatbelt lock casing.

Punched from rear wall 22 is a tongue 23 which is bent off into the inside of the casing and which terminates in an end piece 24 that is bent off approximately parallel to the rear wall. As viewed from the top (FIG. 6a), end piece 24 has a central recess in which is supported a connecting stud 25 which protrudes through stud 10 of anchor 5 and from which areas 25a extend outwardly such that they make contact with tongue 23 and can be subjected to force. Tongue 23 performs the function of the torsion spring according to FIGS. 1 to 3; the function of the device according to FIGS. 5, 6a, and 6b is other-wise the same as FIGS. 1 to 3.

Figure 7:
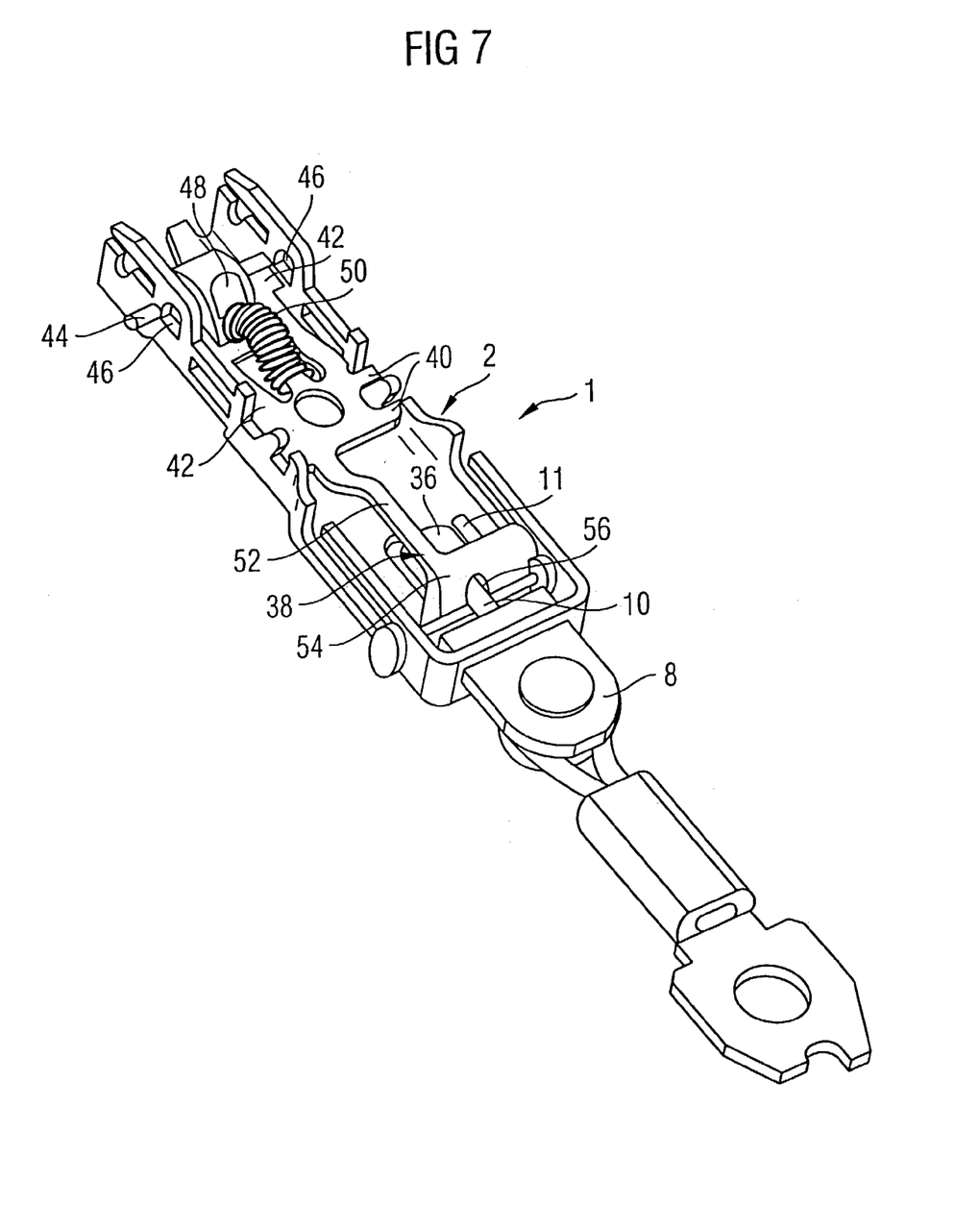
FIG. 7 shows a view of a seatbelt lock casing according to a fourth exemplary embodiment of the invention, without a case cover and with fastened locking mechanism.
Figure 8A:
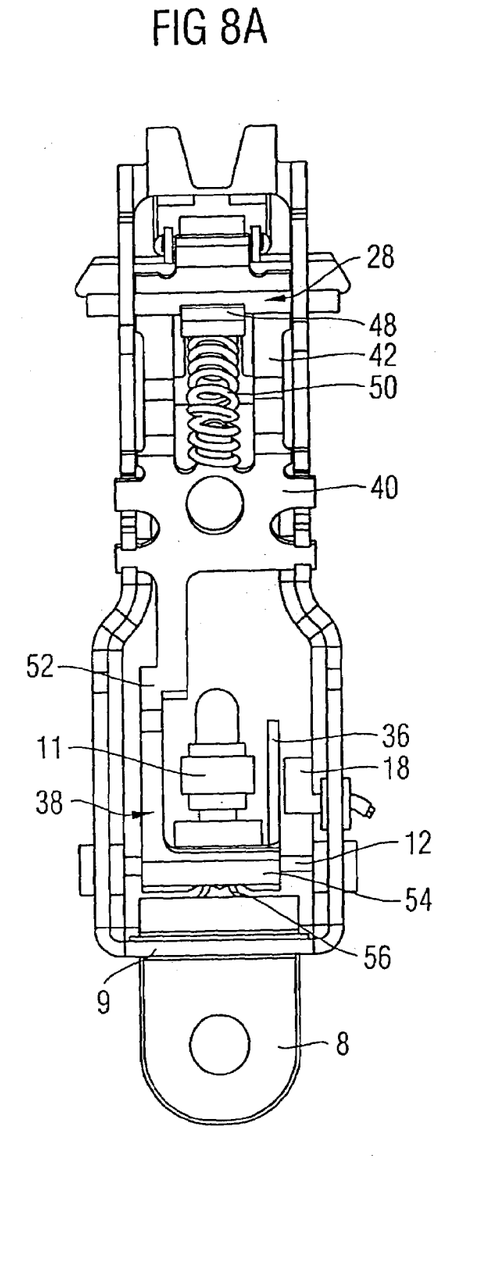
FIG. 8a shows a top view onto the seatbelt lock casing according to the fourth exemplary embodiment of the invention as per FIG. 7, with non-fastened locking mechanism.
Figure 8B:
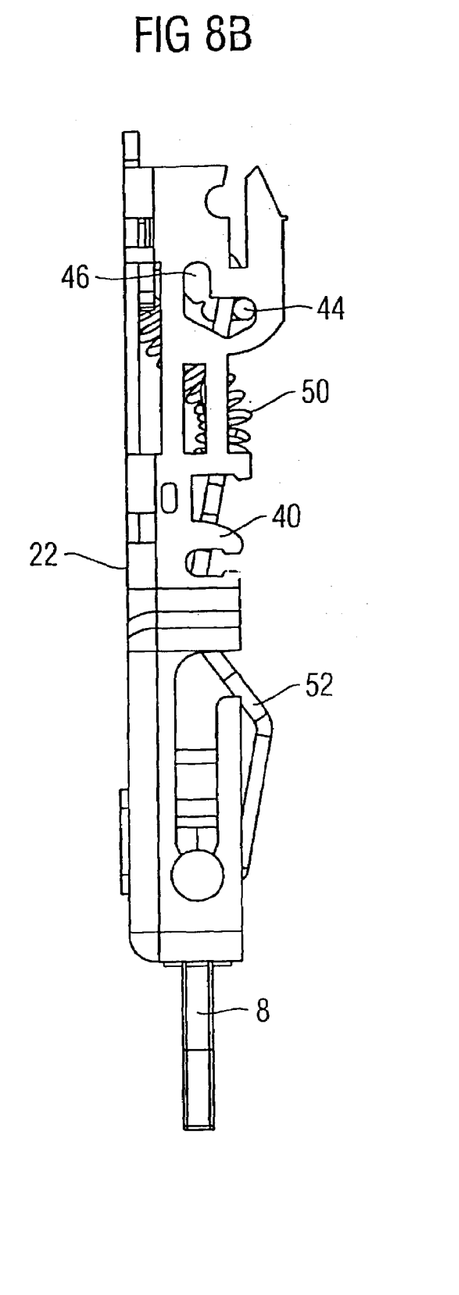
FIG. 8b shows a lateral view of the seatbelt lock casing according to the fourth exemplary embodiment of the invention as per FIG. 7, with non-fastened locking mechanism.

FIGS. 7, 8a, and 8b show a fourth exemplary embodiment of the invention which essentially differs from the first exemplary embodiment in that a component in the area of force-sensing device 1 is designed in such a way that, when the seatbelt lock is not fastened, the magnetic field produced by magnet 11 is changed in the area of Hall sensor 18 in such a way that this can be detected by means of an evaluation circuit that is not shown.

In the fourth embodiment, a screening component 36 (FIG. 8a) is provided which can be moved between Hall sensor 18 and magnet 11 when the seatbelt lock is not fastened. In the example shown, screening component 36 is a sheet-metal tongue (sheet steel, for example) formed on a two-armed lever 38 which is located at 40 on casing 2. The known per se arm of this level 38 facing toward the seatbelt lock has two branches 42 whose ends embrace a known per se bearing neck 44 that is directed in first horizontally then upwardly bent elongated holes 46 of casing 2. A swiveling part 48 is located on bearing neck 44 in a manner that is known per se, between which and a shoulder of lever 38 a coil spring 50 is supported.

Arm 52 of lever 38 facing away from branches 42 is bent downward to a base part 54 via stud 10 of the anchor and has a recess 56 directed on the stud. Screening component 36 protrudes from base part 54. The function of the described arrangement is as follows:

With an unfastened seatbelt lock (FIGS. 8a, 8b), bearing neck 44 is located on the upper ends of elongated holes 46 so that lever 38 is tilted clockwise under the impact of spring 50 and screening component 36 screens sensor 18 from magnet 11.

When the seatbelt lock is fastened, swiveling part 48 with bearing neck 44 is shifted into the position according to FIG. 7 in a manner that is known per se, so that bearing neck 44 enters the horizontal part of elongated holes 46 and swivels lever 38 in an anticlockwise direction and screening component 36 exits from the gap between magnet 11 and sensor 18. By evaluating the sensor signals it is in this way possible to register the fastened or unfastened condition of the seatbelt lock.

It is understood that different screening components are possible depending on sensor design (capacitive, optical etc.) and that the connection between screening component and seatbelt lock latch can be established in another way.

The invention described above serves as an example only and in no way limits the scope. For example, according to the second and third exemplary embodiment the magnet can also be located directly on the stop, whereby additional installation space can be saved. An optical sensor can also be employed instead of the Hall sensor, making a magnet unnecessary. This optical sensor can then be used to determine the position of the anchor and, consequently, for force measurement.

What is claimed is:

1. A seatbelt lock unit having an integrated force-sensing device adapted to measure a belt tensile force acting on a seatbelt lock, comprising:
   a seatbelt lock casing having an opening formed in a front wall thereof;
   a movable anchor at least partially protruding through said opening and having a flange-shaped stop forming a step arranged and constructed to contact the inside of the front wall of the casing around said opening so as to restricts the movement of the anchor within the casing;
   an elastic support normally urging the movable anchor away from the front wall of the casing; and
   a sensor attached to the casing and being arranged and constructed to detect the position of the movable anchor.

2. The seatbelt lock unit according to claim 1, wherein the elastic support comprises a torsion spring that is supported on the anchor and is supported on the casing on opposite sides of the anchor.

3. The seatbelt lock unit according to claim 2, wherein the torsion spring has two arms projecting from the anchor in opposite directions and extend transversely to the direction of movement of the anchor, wherein opposite-facing ends of the torsion spring are disposed in guides formed on opposing walls of the casing, the guides extending approximately parallel to the movement of the anchor and terminating at respective bearing surfaces, wherein the ends of the arms of the torsion spring are adapted to contact the respective bearing surfaces when the anchor is shifted away from the front wall of the casing and, when the anchor is shifted further, the stop is adapted to contact the inside of the front wall of the casing with elastic deformation of the arms.

4. The seatbelt lock unit according to claim 3, wherein the guides are slots which are open at an end facing away from the bearing surfaces.

5. The seatbelt lock unit according to claim 3, wherein the torsion spring has guide rollers that are disposed in the respective guides.

6. The seatbelt lock unit according to claim 2, wherein the torsion spring is an integral part of the anchor.

7. The seatbelt lock unit according to claim 1, wherein the elastic support is formed by a spring that is an integral part of the seatbelt lock casing.

8. The seatbelt lock unit according to claim 1, wherein the anchor carries a magnet and the sensor comprises a Hall sensor that generates an output signal corresponding to the position of the magnet.

9. The seatbelt lock unit according to claim 1, further comprising a screening component located between the anchor and sensor and being arranged and constructed to changes the sensor signal in order to detect the fastening of the seatbelt lock.

10. The seatbelt lock unit according to claim 4, wherein the torsion spring has guide rollers that are disposed in the respective guides.

11. The seatbelt lock unit according to claim 10, wherein the anchor carries a magnet and the sensor comprises a Hall sensor that generates an output signal corresponding to the position of the magnet.

12. The seatbelt lock unit according to claim 11, further comprising a screening component located between the anchor and the sensor and being arranged and constructed to change the sensor signal in order to detect the fastening of the seatbelt lock.

* * * * *